United States Patent
Karimli et al.

(10) Patent No.: US 10,805,862 B2
(45) Date of Patent: Oct. 13, 2020

(54) SENSOR AND SELF-LEARNING BASED DYNAMIC FREQUENCY ASSIGNMENT FOR WIRELESS NETWORKS

(71) Applicant: T-Mobile USA, Inc., Bellevue, WA (US)

(72) Inventors: Yasmin Karimli, Kirkland, WA (US); Gunjan Nimbavikar, Bellevue, WA (US); Puja Gupta, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 103 days.

(21) Appl. No.: 16/054,690

(22) Filed: Aug. 3, 2018

(65) Prior Publication Data

US 2020/0045615 A1    Feb. 6, 2020

(51) Int. Cl.
*H04W 4/00*       (2018.01)
*H04W 48/08*      (2009.01)
*H04W 48/16*      (2009.01)
*H04W 28/06*      (2009.01)
*H04W 16/14*      (2009.01)
(Continued)

(52) U.S. Cl.
CPC .......... *H04W 48/08* (2013.01); *H04W 16/14* (2013.01); *H04W 24/02* (2013.01); *H04W 28/0247* (2013.01); *H04W 28/065* (2013.01); *H04W 48/16* (2013.01); *G06N 20/00* (2019.01)

(58) Field of Classification Search
CPC ..... H04W 48/08; H04W 48/16; H04W 16/14; H04W 28/0247; H04W 28/065
See application file for complete search history.

(56) References Cited

U.S. PATENT DOCUMENTS 9,913,282 B2 * 3/2018 Aksu ................. H04W 72/0486
2010/0254344 A1  10/2010 Wei et al.
(Continued)

FOREIGN PATENT DOCUMENTS

CN          104125576 A  * 10/2014
WO       WO2017186294 A1   11/2017

OTHER PUBLICATIONS

PCT Search Report and Written Opinion dated Nov. 8, 2019 for PCT Application No. PCT/US2019/042959, 13 pages.

*Primary Examiner* — Maharishi V Khirodhar
(74) *Attorney, Agent, or Firm* — Lee & Hayes, P.C.

(57) ABSTRACT

Techniques for dynamically assigning frequency resources in a wireless network are discussed herein. For example, a network device can implement a self-organizing network to allocate frequency resources to a base station based on an availability of such frequency resources, as well as data indicating one or more conditions at a base station. The network device can receive information associated with the base station, such as load information, coverage information, capability information, interference information, and the like. In some examples, the network device can use a machine learning algorithm to select frequency resources from licensed bands, a Citizens Broadband Radio Service band, or unlicensed bands. Frequency resource allocation information can be used to configure the base station to facilitate wireless communications using such frequency resources. As the conditions at a base station change over time (e.g., hourly, daily, weekly, etc.), frequency resources can be allocated and deallocated at the base station.

20 Claims, 5 Drawing Sheets

(51) Int. Cl.
  *H04W 28/02*  (2009.01)
  *H04W 24/02*  (2009.01)
  *G06N 20/00*  (2019.01)

(56) References Cited

U.S. PATENT DOCUMENTS

| | | |
|---|---|---|
| 2014/0274090 A1* | 9/2014 | Mitchell ............... H04W 40/20 |
| | | 455/452.1 |
| 2015/0382201 A1 | 12/2015 | Chou et al. |
| 2016/0050676 A1* | 2/2016 | Sinnaduray ......... H04W 72/082 |
| | | 370/329 |
| 2016/0381600 A1 | 12/2016 | Aksu |
| 2017/0094535 A1 | 3/2017 | Nuss et al. |
| 2018/0084429 A1* | 3/2018 | Guo ................... H04W 72/0406 |
| 2018/0139615 A1* | 5/2018 | Cui ................... H04W 72/0453 |
| 2019/0124665 A1* | 4/2019 | Singh ................ H04W 72/0486 |
| 2019/0306925 A1* | 10/2019 | Iskander ............... H04W 76/27 |

\* cited by examiner

```
┌─────────────────────────────────────────────────────────┐
│ RECEIVE, FROM A SPECTRUM ACCESS SYSTEM (SAS), USAGE     │
│ INFORMATION ASSOCIATED WITH FIRST FREQUENCY RESOURCES   │
│ ASSOCIATED WITH A CITIZENS BROADBAND RADIO SERVICE (CBRS)│
│                          402                            │
└─────────────────────────────────────────────────────────┘
                             │
                             ▼
┌─────────────────────────────────────────────────────────┐
│ RECEIVE, FROM A BASE STATION, FIRST ALLOCATION INFORMATION│
│ ASSOCIATED WITH SECOND FREQUENCY RESOURCES ALLOCATED TO │
│                    THE BASE STATION                     │
│                          404                            │
└─────────────────────────────────────────────────────────┘
                             │
                             ▼
┌─────────────────────────────────────────────────────────┐
│ RECEIVE, FROM THE BASE STATION, LOAD INFORMATION ASSOCIATED│
│ WITH THE BASE STATION, THE LOAD INFORMATION INDICATING A│
│ LEVEL OF WIRELESS TRAFFIC PROVIDED BY THE BASE STATION  │
│           USING THE SECOND FREQUENCY RESOURCES          │
│                          406                            │
└─────────────────────────────────────────────────────────┘
                             │
                             ▼
┌─────────────────────────────────────────────────────────┐
│ DETERMINE, BASED AT LEAST IN PART ON THE USAGE INFORMATION,│
│  THAT A PORTION OF THE FIRST FREQUENCY RESOURCES IS     │
│                AVAILABLE AT A FIRST TIME                │
│                          408                            │
└─────────────────────────────────────────────────────────┘
                             │
                             ▼
┌─────────────────────────────────────────────────────────┐
│ DETERMINING THAT THE LEVEL OF WIRELESS TRAFFIC MEETS OR │
│        EXCEEDS A THRESHOLD VALUE AT THE FIRST TIME      │
│                          410                            │
└─────────────────────────────────────────────────────────┘
                             │
                             ▼
┌─────────────────────────────────────────────────────────┐
│ SELECTING, BASED AT LEAST IN PART ON THE LEVEL OF WIRELESS│
│  TRAFFIC MEETING OR EXCEEDING THE THRESHOLD VALUE, THE  │
│       PORTION OF THE FIRST FREQUENCY RESOURCES          │
│                          412                            │
└─────────────────────────────────────────────────────────┘
                             │
                             ▼
┌─────────────────────────────────────────────────────────┐
│ SENDING SECOND ALLOCATION INFORMATION TO THE BASE STATION,│
│ THE SECOND ALLOCATION INFORMATION CONFIGURING THE BASE  │
│   STATION TO USE THE PORTION OF THE FIRST FREQUENCY     │
│                       RESOURCES                         │
│                          414                            │
└─────────────────────────────────────────────────────────┘
```

SENSOR AND SELF-LEARNING BASED DYNAMIC FREQUENCY ASSIGNMENT FOR WIRELESS NETWORKS

BACKGROUND

Traditionally, service providers have obtained licenses to conduct wireless communications in a particular range of frequencies, and accordingly, have programmed base stations in a wireless network to use a fixed set of frequency resources. However, a number of user devices has grown over time, greatly increasing an amount of wireless traffic to be handled by the wireless networks.

The Citizens Broadband Radio Service (CBRS) enables shared wireless broadband use of the 3550-3700 megahertz (MHz) band (3.5 gigahertz (GHz) band). Historically, a portion of the CBRS band has been used by the United States Navy, satellite service providers, and utilities. However, the CBRS band has recently been availed for new commercial mobile uses.

CBRS is governed by a three-tiered spectrum authorization framework to accommodate a variety of commercial uses on a shared basis with incumbent users of the 3.5 GHz band. The three-tiered spectrum authorization framework provides Incumbent Access users priority access over Priority Access users, and Priority Access users priority access over General Authorized Access users. Incumbent Access users include authorized federal and grandfathered Fixed Satellite Service users. The Federal Communications Commission has implemented rules protecting such users from harmful interference from Priority Access and General Authorized Access users. That is, Incumbent Access users have priority access to the 3.5 GHz band. Priority Access users are granted access to the 3.5 GHz band via a Priority Access License assigned using competitive bidding within the 3550-3650 MHz portion of the 3.5 GHz band. General Authorized Access users are granted access via a licensed-by-rule, which permits open, flexible access to any portion of the 3550-3700 MHz band, so long as the portion of the 3550-3700 MHz band is not assigned to a higher tier (e.g., Incumbent Access or Priority Access). In some situations, access to the CBRS can be controlled, at least in part, by a Spectrum Access System (SAS), which may utilize rules to protect Incumbent Access uses and Priority Access users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems, devices, and methods are directed to dynamic frequency assignments for wireless networks. For example, a network device can implement a self-organizing network (SON) to allocate frequency resources to one or more base stations based on an availability of such frequency resources, as well as data indicating one or more conditions at a base station. For example, the network device can receive information including, but not limited to: load information of a base station; coverage information of a base station; capability information of devices in communication with a base station; interference information of devices and/or a base station; and the like. In some examples, the network device can use a machine learning algorithm to select one or more frequency resources, including but not limited to: licensed bands (e.g., LTE Band 2 (1900 MHz), LTE Band 4 (1700 MHz), and the like); Citizens Broadband Radio Service (CBRS) band; unlicensed bands (e.g., Licensed Assisted Access (LAA) at 5 GHz); and/or frequencies usable by one or more of 3G, 4G, and/or 5G devices. Upon selecting or determining one or more frequency resources to provide to a base station, the base station can be configured to facilitate wireless communications using such frequency resources. As the conditions at a base station change over time (e.g., hourly, daily, weekly, etc.), frequency resources can be allocated and deallocated to and from the base station.

By way of example, and without limitation, a base station can be allocated one or more frequency resources in a licensed band, such as LTE Band 2 and/or LTE Band 4. The base station can utilize the frequency resources to exchange data with one or more user equipment (UE) in communication with the base station. The base station can send operation information to a network device periodically or at any interval indicating the conditions at the base station over time (e.g., load, coverage, capability, interference, etc.). As may be understood, a number of UEs in communication with the base station may vary dynamically over time. In some instances, a load present at the base station (e.g., a number of UEs in communication with the base station, a bandwidth provided by the base station, a number of channels used by the base station, etc.) may meet or exceed a load level associated with the base station. Accordingly, the network device receiving such information can determine if one or more additional frequency resources are available to the base station at that time to support the additional load. For example, the network device can determine if frequency resources associated with the CBRS band are available. If such resources are available, the network device can send allocation information to the base station to configure the base station to utilize the frequency resources. The base station can utilize frequency resources, and can release the frequency resources at a subsequent time when a load has fallen below a threshold level.

As mentioned above, the network device can receive various data representing the conditions at the base station to select frequency resources to allocate to the base station. In some instances, the network device can use one or more machine learning algorithms to select the frequency resources to allocate to the base station. For example, the machine learning algorithm can receive as inputs information associated with the conditions at the base station, as well as the frequency resources that are available for allocation. In some instances, the network device can receive an indication (e.g., from a Spectrum Access System (SAS)) regarding an availability of one or more frequency resources associated with the CBRS band. For example, in some instances, one or more channels of the CBRS band may be allocated to an Incumbent Access user or a Priority Access user, and may not be available to be allocated to a base station. Accordingly, the network device can select one or more frequency resources to provide to the base station to optimize wireless communications provided by the base station.

In some instances, the network device can allocate one or more frequency resources utilizing one or more of 3G, 4G LTE, and/or 5G technologies. That is, the network device can use all available technologies and/or bands to allocate frequency resources to one or more base stations in a network.

In some instances, a network device implementing the techniques discussed herein can use frequency resources in at least one of an LTE Band 71 (e.g., a 600 MHz band), an LTE Band 48 (e.g., 3500 MHz), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). In some instances, frequency resources in the range of 600 MHz-6000 MHz can be referred as "low-band" and "mid-band." In some instances, the frequency resources may include "millimeter wave" bands including, but not limited to 26 GHz, 28 GHz, 38 GHz, 60 GHz, and the like. The techniques discussed herein are applicable to any frequency resources, and are not limited to those expressly recited above.

In some instances, the systems, devices, and techniques described herein can improve a functioning of a network. For example, dynamically allocating frequency resources to base stations can improve the functioning of the network by increasing capacity in times of congestion, interference, etc. In some instances, the network device can prevent a base station transmission from interfering with Incumbent Access users or Priority Access users by not allocating frequency resources that are used by such users. In some instances, the network device can allocate frequency resources in contiguous bands to reduce a scanning burden by UEs in communication with a particular base station. In some instances, deallocating the frequency resources when not needed by the base station can allow other base stations to use such frequency resources as needed. In some instances, implementing the dynamic frequency allocation techniques in a self-organizing network can reduce an amount of processing required (e.g., by network engineers) and/or can reduce any periods of reduced network efficiency or connectivity due to a delay in allocating resources. These and other improvements to the functioning of a computer and network are discussed herein.

The systems, devices, and techniques described herein can be implemented in a number of ways. Example implementations are provided below with reference to the following figures.

Figure 1:
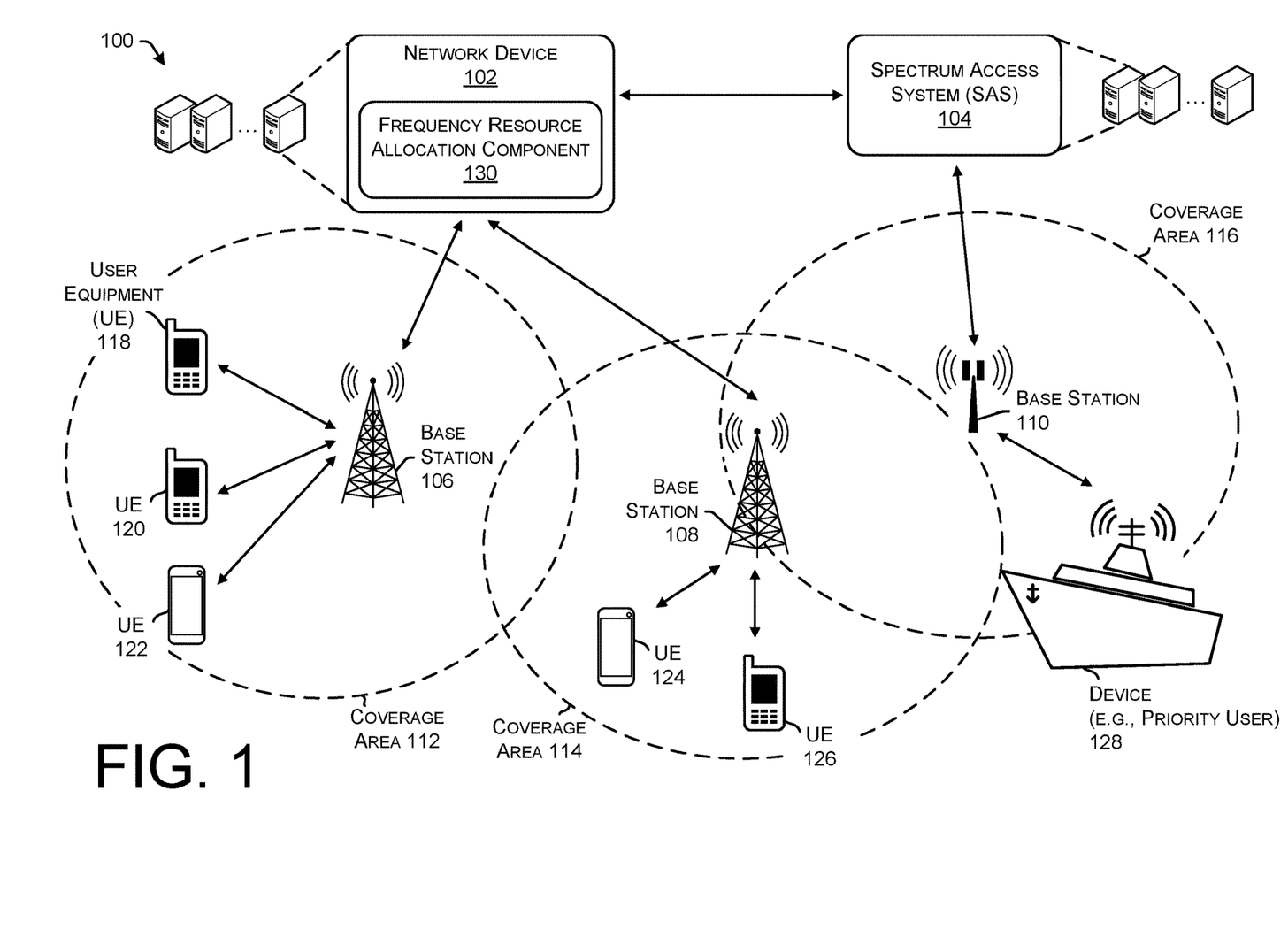
FIG. 1 illustrates an example environment including a network device, a spectrum access system, and a plurality of base stations, the network device including functionality to dynamically allocate frequency resources to one or more base stations based on demand and/or availability, in accordance with embodiments of the disclosure.

FIG. 1 illustrates an example environment 100 including a network device 102, a Spectrum Access System (SAS) 104, and a plurality of base stations 106, 108, and 110, with the network device 102 including functionality to dynamically allocate frequency resources to the one or more base stations 106, 108, and/or 110 based on demand and/or availability, in accordance with embodiments of the disclosure.

The base station 106 can be associated with a coverage area 112, the base station 108 can be associated with a coverage area 114, and the base station 110 can be associated with a coverage area 116. In some instances, the coverage areas 112, 114, and 116 can correspond to a geographic region where communications are supported by each base station 106, 108, and 110, respectively, as a function of which frequency resources are allocated to each base station.

In some instances, the base station 106 can be associated with user equipment (UE) 118, 120, and 122. Of course, any number of UEs can be within the coverage area 112 of the base station 106.

In some instances, the base station 108 can be associated with UEs 124 and 126. Of course, any number of UEs can be within the coverage area 114 of the base station 108.

In some instances, the base station 110 can be associated with a device 128, which may correspond to a naval ship represented as an Incumbent Access user (e.g., an incumbent device) or as a Priority Access user (e.g., a priority device). In some instances, the base station 110 may or may not be under control of the network device 102. In some instances, the base station 110 can provide service to the device 128 in the CBRS band. In some instances, the base station 110 may be instead represented as a radar station operating in the CBRS band, for example.

Examples of the user equipment (UE) 118, 120, 122, 124, and 126 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 118, 120, 122, 124, and 126 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

In general, the base stations 106, 108, and 110 can be implemented as a variety of technologies to provide wired and/or wireless access to the network, as discussed herein. In some instances, the base stations 106, 108, and 110 can include a 3GPP RAN, such a GSM/EDGE RAN (GERAN), a Universal Terrestrial RAN (UTRAN), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the base stations 106, 108, and 110 can include any number and type of transceivers and/or base stations representing any number and type of macrocells, microcells, picocells, or femtocells, for example, with any type or amount of overlapping coverage or mutually exclusive coverage.

The network device 102 can further include a frequency resource allocation component 130. The frequency resource allocation component 130 is discussed in the context of FIG. 1, as well as throughout this disclosure.

The Spectrum Access System (SAS) 104 can include functionality to monitor a use of the CBRS band by one or more of Incumbent Access users, Priority Access users, and General Authorized Access (GAA) users. For example, the SAS 104 can include a database indicating which frequency resources are used by which users (e.g., Incumbents, Priority, and General), at which times, and at which locations. In some instances, when the device 128 is in communication with the base station 110, the base station 110 can provide an indication to the SAS 104 that the device 128 is using CBRS frequency resources, and accordingly, that the particular CBRS frequency resource should not be allocated to a base station, as discussed herein.

By way of example, the frequency resource allocation component 130 can allocate one or more frequency resources to the base stations 106 and 108. Considering an example where the device 128 is not present within the coverage area 116, one or more CBRS frequency resources may be allocated to one or more base stations 106 or 108, as discussed herein. At a first time, the UEs 124 and 126 are in communication with the base station 108. The base station 108 can transmit conditions of the base station 108 (e.g., load, coverage, capability, interference, allocation, etc.) to the network device 102 to inform the frequency resource allocation component 130 about the use of frequency resources by the base station 108. In one example, the base station 108 is allocated a first frequency resource, such as the Long Term Evolution (LTE) Band 2. As the UE 124 and 126 utilize the base station 108, a load of the base station 108 may increase such that the load of the base station 108 may be above a threshold level. In such a case, the base station 108 may transmit load information to the network device 102. In some embodiments, a determination that the load is above a threshold may be made at the network device 102 based on information received from the base station 108. In any event, in response to the load being above a threshold, for example, the frequency resource allocation component 130 can determine that one or more additional frequency resources are available to allocate to the base station 108, and accordingly, can send allocation information to the base station 108 to configure the base station 108 to use the allocated frequency resources. Additional information to be received by the network device 102 in determining frequency resource allocations is discussed below in FIG. 2, as well as throughout this disclosure.

Continuing with the example discussed above, in some instances, the one or more additional frequency resources include one or more channels of the CBRS band, one or more channels from a licensed band, and/or one or more channels of an unlicensed band. In some instances, the frequency resources selected by the frequency resource allocation component 130 can be based at least in part on machine learning algorithms based on rules and/or training data indicating an optimal allocation of resources based on the conditions present and/or based on the available frequency resources.

In some examples, the base station 108 can determine capability information associated with the UEs 124 and 126 connected to the base station 108. For example, when the UE 124 initiates a connection with the base station 108, the UE 124 can provide an indication of which frequency resources are usable by the UE 124. Similarly, the UE 126 can provide an indication of which frequency resources are usable by the UE 126. This capability information can be provided to the network device 102 to ensure that the frequency resources allocated to the base station 108 can be used by the connected UE 124 and/or 126.

In some examples, the base station 108 can determine a coverage associated with the base station 108 (e.g., the coverage area 114). In some instances, the coverage information can be provided to the network device 102 to inform the network device 102 of any overlapping regions between adjacent base stations (e.g., to determine that the coverage areas 114 and 116 of the base stations 108 and 110, respectively, at least partially overlap). For example, a use of one or more frequency resources by the base station 110 may not necessarily preclude the same use of the same frequency resources by the base station 106 as the coverage areas 112 and 116 do not overlap. Further, the coverage information can include an indication of the size of the coverage area 114, such that the frequency resources selected by the frequency resource allocation component 130 can be based on the size of the coverage area 114 (e.g., selecting lower frequencies for larger coverage areas, etc.).

In some examples, the base station 108 can provide interference information to the network device 102, such that when one or more UEs 124 or 126 experience interference levels that meets or exceeds an interference threshold, the frequency resource allocation component 130 can select another frequency resource that may result in lower interference levels.

In some instances, the environment 100 can further include one or more communication servers to facilitate communications by and between the various devices in the environment 100. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Thus, the environment 100 may implement GSM, UMTS, and/or LTE/LTE Advanced telecommunications technologies. The environment 100 may include, but is not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 118, 120, 122, 124 and 126, the base station 106, 108, and 110, and one or more endpoints of the network (e.g., servers, websites, etc.). While FIG. 1 illustrates the example environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

In some instances, the user equipment 118, 120, 122, 124, and/or 126 can communicate with any number of user equipment, servers, network devices, computing devices, and the like.

Figure 2:
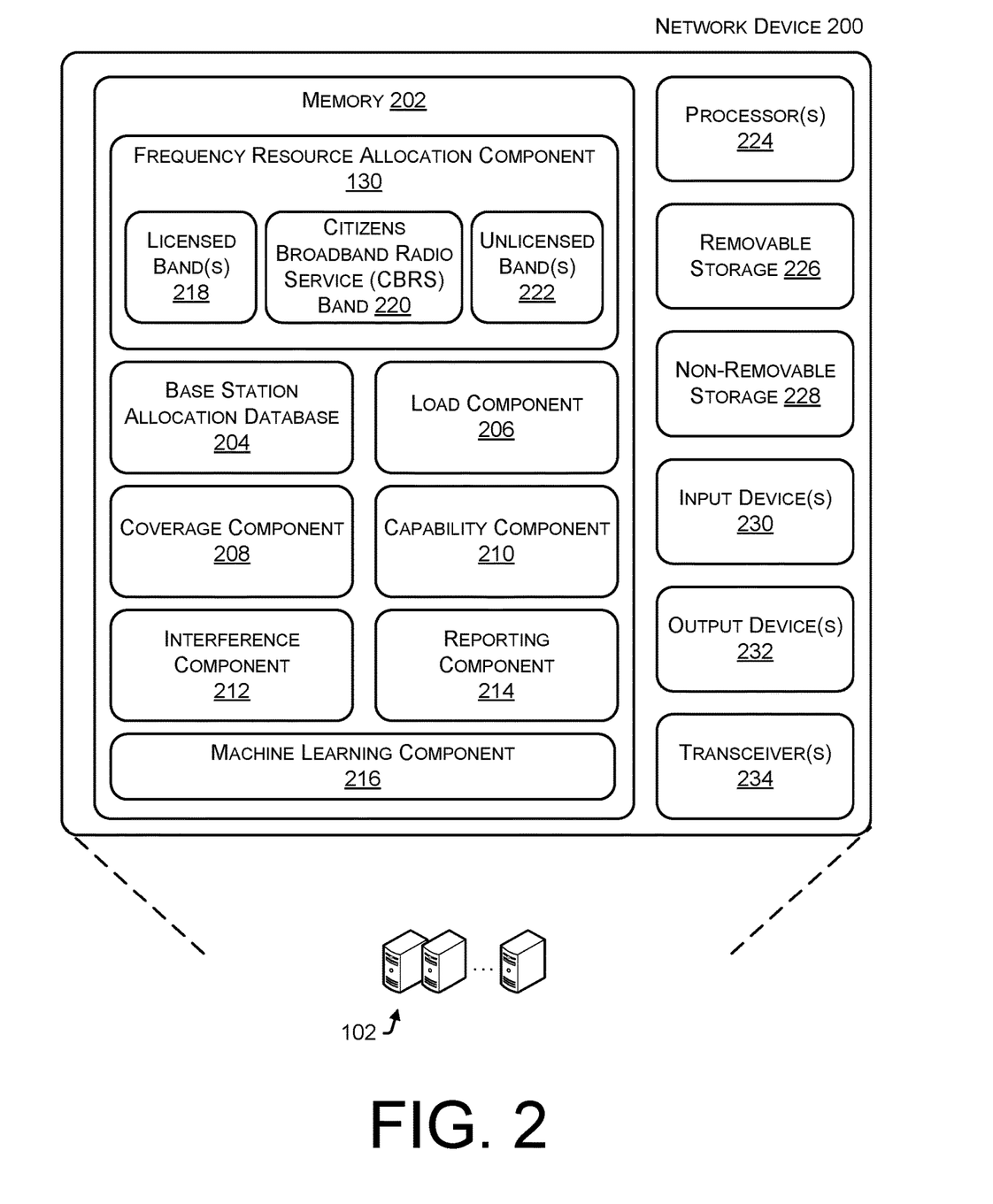
FIG. 2 illustrates an example network device configured to dynamically allocate frequency resources to one or more base stations, in accordance with embodiments of the disclosure.

FIG. 2 illustrates an example network device 200 configured to dynamically allocate frequency resources to one or more base stations, in accordance with embodiments of the disclosure. In some embodiments, the network device 200 can correspond to the network device 102 of FIG. 1. It is to be understood in the context of this disclosure that the network device 200 can be implemented as a single device or as a plurality of devices with components and data distributed among them.

As illustrated, the network device 200 comprises a memory 202 storing the frequency resource allocation component 130, a base station allocation database 204, a load component 206, a coverage component 208, a capability component 210, an interference component 212, a reporting component 214, and a machine learning component 216. The frequency resource allocation component 130 further includes the licensed band(s) 218, the citizens broadband radio service (CBRS) band 220, and unlicensed band(s) 222 (e.g., a Licensed Assisted Access (LAA) resource). Also, the network device 200 includes processor(s) 224, a removable storage 226 and non-removable storage 228, input device(s) 230, output device(s) 232, and transceiver(s) 234.

In various embodiments, the memory 202 is volatile (such as RAM), non-volatile (such as ROM, flash memory, etc.) or some combination of the two. The frequency resource allocation component 130, the base station allocation database 204, the load component 206, the coverage component 208, the capability component 210, the interference component 212, the reporting component 214, and the machine learning component 216 stored in the memory 202 can comprise methods, threads, processes, applications or any other sort of executable instructions. The frequency resource allocation component 130, the base station allocation database 204, the load component 206, the coverage component 208, the capability component 210, the interference component 212, the reporting component 214, and the machine learning component 216 can also include files and databases.

In general, the frequency resource allocation component 130 can include functionality to select one or more frequency resources to allocate to a base station. As discussed above, the frequency resource allocation component 130 includes frequency resources associated with one or more licensed band(s) 218, the CBRS band 220, and one or more unlicensed band(s) 222. In some instances, the licensed band(s) 218 can correspond to a range of frequencies that are licensed by a service provider or network operator associated with the network device 200. In some instances, the licensed band(s) 218 may include, but is not limited to, an LTE Band 2 (e.g., 1900 MHz), LTE LTE Band 4 (1700 MHz), and the like. In some instances, the CBRS band 220 can correspond to broadband use of the 3550-3700 MHz band (e.g., 3.5 gigahertz (GHz) band). In some instances, if the network device is associated with a Priority Access License (PAL) with one or more frequency resources of the CBRS band 220, such frequency resources can be associated with the licensed band(s) 218 and/or the CBRS band 220. In some instances, the unlicensed band(s) 222 can correspond to a 5 GHz band. As can be understood, the frequency resource allocation component 130 can select one or more channels of one or more frequency resources with a variety of widths, including but not limited to: 1.4 MHz, 3 MHz, 5 MHz, 10 MHz, 15 MHz, 20 MHz, and the like. In some instances, channels of any width can be used. As can be understood, the examples of frequency resources associated with the licensed band(s) 218, the CBRS band 220, and/or the unlicensed band(s) 222 are not intended to be limiting, and any number of frequency resources are contemplated herein.

The base station allocation database 204 can include functionality to store information regarding which frequency resources are allocated to which base stations. For example, the base station allocation database 204 can associate frequency resources with base station identifiers to determine which frequency resources not currently allocated to a base station can be allocated to the particular base station (e.g., if needed). In some instances, the base station allocation database 204 can receive information from a base station regarding the frequency resources allocated to the base station. In some instances, the network device 200 can update the base station allocation database 204 at a time in which the network device 200 allocates a frequency resource to a particular base station. In some instances, the base station allocation database 204 can receive an indication from the SAS 104 including an indication of whether one or more frequency resources of the CBRS band 220 are allocated to an Incumbent Access user, a Priority Access user, and/or a General Authorized Access user.

The load component 206 can include functionality to receive load information from a base station regarding the load at the base station. In some examples, the load information can include but is not limited to: a number of UEs connected to a base station; an amount of bandwidth of traffic handled by the base station (e.g., relative to a total amount of bandwidth); a size of packet queues associated with a base station; a number of dropped packets of the base station; a delay associated with one or more communications of the base station; a number of channels used by one or more UEs; a packet jitter associated with the base station; and the like. In some instances, the load component 206 can store the load information as historical load information to use for allocating frequency resources. For example, historical periods of increased load may predict periods of future load. In some instances, the load component 206 can store load information in conjunction with the frequency resources allocated to the base station to determine a "cause and effect" for allocating one or more frequency resources in response to an increased load. In some instances, the load component 206 can include one or more threshold values which can be used to determine whether to allocate additional frequency resources to a base station.

The coverage component 208 can include functionality to receive coverage information associated with a base station. In some instances, the coverage information can represent a geographical region associated with the base station. In some instances, the coverage information can be based at least in part on location information captured by individual UEs when the UEs are connected to a base station. In some instances, the location information can be determined via triangulating a signal associated with a UE via a plurality of base stations. In some instances, the coverage information can include information about base stations that are adjacent to a particular base station (e.g., for the purpose of determining whether the use of a CBRS band frequency resource by an Incumbent, Priority, or General user restricts whether a CBRS band frequency resource can be allocated to a particular base station).

In some instances, the coverage component 208 can receive information regarding a distance between one or more UEs and a location of the base station. For example, the frequency resource allocation component 130 can allocate frequency resources with propagation characteristics that correspond to distances between one or more UEs and the base stations.

The capability component 210 can include functionality to receive capability information associated with one or more UEs in communication with a base station. For example, as UEs initiate a communication with a base station, the UE can provide an indication to the base station regarding which frequency resources are supported by the UE. In some instances, the base station can provide capability information to the capability component 210 to inform the network device 200 which frequency resources are to be allocated to a base station. For example, if a base station is experiencing congestion, the frequency resource allocation component 130 can determine which frequency resources to allocate to the base station based on whether the UEs can operate using those frequency resources. That is, if the UEs cannot use a frequency resource (or more UEs would benefit from a particular frequency resource), the frequency resource allocation component 130 can allocate one or more frequency resources that share a commonality between a plurality of UEs. For example, the capability component 210 can select a frequency resource to optimize a number of UEs that can use the selected frequency, in some instances.

The interference component 212 can include functionality to receive interference information from a base station. In some instances, the interference information can correspond to a signal-to-noise ratio (SNR) and/or a signal-to-interference-plus-noise ratio (SINR) associated with one or more channels with the frequency resources allocated to a base station. In some instances, the interference information can include individual interference information associated with one or more UEs in communication with a base station, and in some instances, the interference information can represent aggregate interference levels at a base station. In some instances, the interference information can include, but is not limited to: a received signal strength indication (RSSI); reference signal received power (RSRP); reference signal received quality (RSRQ); and the like.

The reporting component 214 can include functionality to communicate with the SAS 104 regarding a status of one or more frequency resources in the CBRS band. For example, the reporting component 214 can receive one or more indications from the SAS 104 that a channel of the CBRS band is allocated to an Incumbent Access user, a Priority Access user, or a General Authorized Access user, and accordingly, that such a channel should not be allocated to the base stations 106 or 108. In some instances, the reporting component 214 can send to the SAS 104 one or more indications that one or more frequency resources in the CBRS band have been allocated to a base station by the network device 200. In some instances, the reporting component 214 can send a location of the base station, a number of UE supported by the base station, and the like.

The machine learning component 216 can include functionality to determine one or more frequency resources to allocate to a base station based at least in part on some or all of the information received from the particular base station, as discussed herein. For example, the machine learning component 216 can include one or more models that receive as inputs the available frequency resources and the operating conditions at a base station and provide as an output one or more frequency resources to allocate to the base station. In some instances, the machine learning component 216 can be based at least in part on historical data of base station operating conditions. In some instances, various machine learned models can be used. For instance, supervised machine learning algorithms, unsupervised machine learning algorithms, deep learning algorithms, etc. can be used for generating (e.g., training) the machine learned models. Examples of machine learning algorithms include, but are not limited to: decision trees; k-means clustering; principal component analysis; neural networks; convolutional neural networks; deep neural networks; recurrent neural networks; and the like.

In some embodiments, the processor(s) 224 is a central processing unit (CPU), a graphics processing unit (GPU), or both CPU and GPU, or other processing unit or component known in the art.

The network device 200 also includes additional data storage devices (removable and/or non-removable) such as, for example, magnetic disks, optical disks, or tape. Such additional storage is illustrated in FIG. 2 by removable storage 226 and non-removable storage 228. Tangible computer-readable media can include volatile and nonvolatile, removable and non-removable media implemented in any method or technology for storage of information, such as computer readable instructions, data structures, program modules, or other data. The memory 202, the removable storage 226 and the non-removable storage 228 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the network device 200. Any such tangible computer-readable media can be part of the network device 200.

The network device 200 can include input device(s) 230, such as a keypad, a cursor control, a touch-sensitive display, etc. Also, the network device 200 can include output device(s) 232, such as a display, speakers, etc. These devices are well known in the art and need not be discussed at length here.

As illustrated in FIG. 2, the network device 200 can include one or more wired or wireless transceiver(s) 234. In some wireless embodiments, to increase throughput, the transceiver(s) 234 can utilize multiple-input/multiple-output (MIMO) technology. The transceiver(s) 234 can be any sort of wireless transceivers capable of engaging in wireless, radio frequency (RF) communication, as discussed herein. The transceiver(s) 234 can also include other wireless modems, such as a modem for engaging in Wi-Fi, WiMAX, Bluetooth, infrared communication, or the like.

Figure 3:
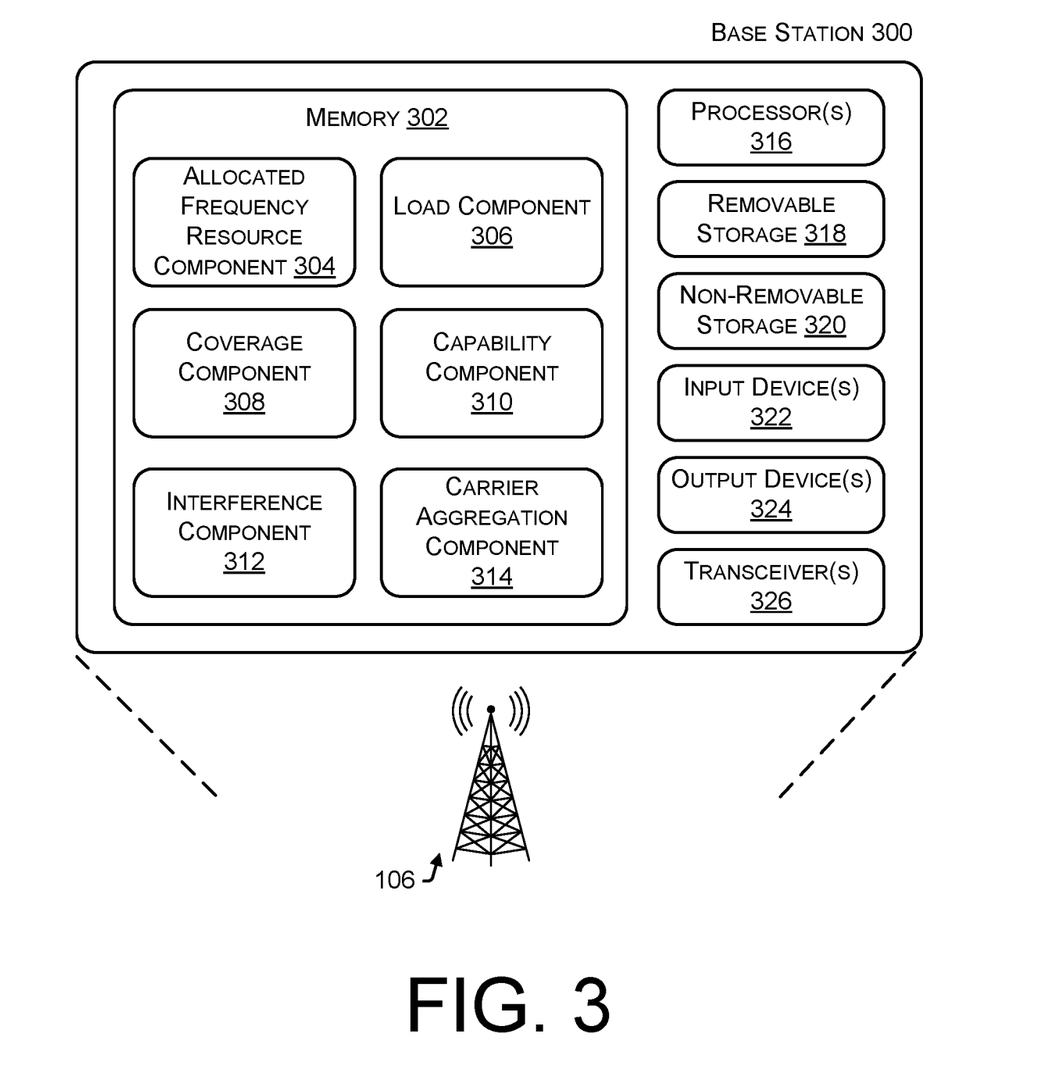
FIG. 3 illustrates an example base station configured to receive frequency resources allocated to the base station by a network device, and to facilitate one or more communications using carrier aggregation, in accordance with embodiments of the disclosure.

FIG. 3 illustrates an example base station 300 configured to receive frequency resources allocated to the base station by a network device, and to facilitate one or more communications using carrier aggregation, in accordance with embodiments of the disclosure. In some embodiments, the base station 300 can correspond to the base stations 106, 108, and/or 110 of FIG. 1. It is to be understood in the context of this disclosure that the base station 300 can be implemented as a single device or as a plurality of devices with components and data distributed among them.

As illustrated, the base station 300 comprises a memory 302 storing an allocated frequency resource component 304, a load component 306, a coverage component 308, a capability component 310, an interference component 312, and a carrier aggregation component 314. Also, the base station 300 includes processor(s) 316, a removable storage 318 and non-removable storage 320, input device(s) 322, output device(s) 324, and transceiver(s) 326.

In various embodiments, the memory 302 is volatile (such as RAM), non-volatile (such as ROM, flash memory, etc.) or some combination of the two. The allocated frequency resource component 304, the load component 306, the coverage component 308, the capability component 310, the interference component 312, and the carrier aggregation component 314 stored in the memory 302 can comprise methods, threads, processes, applications or any other sort of executable instructions. The allocated frequency resource component 304, the load component 306, the coverage component 308, the capability component 310, the interference component 312, and the carrier aggregation component 314 can also include files and databases.

The allocated frequency resource component 304 can include functionality to receive one or more frequency resources allocated to the base station 300 by the network device 200, for example. In some instances, the allocated frequency resource component 304 can configure the base station 300 to operate using the one or more frequency resources by exchanging data with one or more UEs using the one or more frequency resources. In some instances, the allocated frequency resource component 304 can update the allocated frequency resource information as frequency resources are allocated and deallocated to and from the base station 300.

The load component 306 can include functionality to determine a load at the base station 300. In some examples, the load component 306 can determine one or more of: a number of UEs connected to the base station 300; an amount of bandwidth of traffic handled by the base station 300 (e.g., relative to a total amount of bandwidth); a size of packet queues associated with the base station 300; a number of dropped packets of the base station 300; a delay associated with one or more communication of the base station 300; a number of channels used by one or more UEs; a packet jitter associated with the base station 300; and the like. In some instances, the load component 306 can determine a load associated with each frequency resource. In some instances, the load component 306 can include one or more threshold values that indicate, when a respective measured condition meets or exceeds those one or more threshold values, whether the base station is experiencing a congestion condition. In some instances, the load component 306 can send load information to the network device 200.

The coverage component 308 can include functionality to determine coverage information associated with the base station 300. In some instances, the coverage information can be associated with a geographic region of the base station signals, which may vary by frequency resources. For example, a coverage area of the base station 300 using gigahertz waves may be smaller than a coverage area of the base station 300 using megahertz waves. In some instances, the coverage component 308 can include location information associated with individual UEs in communication with the base station 300. For example, individual UEs can send location information (e.g., determined via GPS) to the base station 300, and in some instances, a location of a UE can be triangulated by capturing signals associated with a UE at various base stations. In some instances, the coverage component 308 can provide coverage information to the network device 200.

The capability component 310 can include functionality to receive capability information from one or more UEs in communication with the base station 300. For example, the capability information can include, but is not limited to: indications from one or more UEs that the UE can utilize a particular frequency resource; indications that a UE can support carrier aggregation; that a UE can support real time text (RTT), voice, video, data, etc.; and the like. In some instances, the capability component 310 can send the capability information to the network device 200.

The interference component 312 can include functionality to determine interference information associated with communications by and between one or more UEs and the base station 300. In some instances, the interference information can correspond to a signal-to-noise ratio (SNR) and/or a signal-to-interference-plus-noise ratio (SINR) associated with one or more channels with the frequency resources allocated to the base station 300. In some instances, the interference information can include individual interference information associated with one or more UEs in communication with the base station 300, and in some instances, the interference information can represent aggregate interference levels at the base station 300. In some instances, the interference information can include, but is not limited to: a received signal strength indication (RSSI); reference signal received power (RSRP); reference signal received quality (RSRQ); and the like.

The carrier aggregation component 314 can include functionality to aggregate (e.g., combine or use multiple) component carriers in one or more frequency resources to increase a bandwidth to provide to one or more UEs. In some instances, the carrier aggregation component 314 can use contiguous component carriers (e.g., intra band), and in some instances, the carrier aggregation component 314 can use intra-band, non-contiguous carriers, or inter-band, non-contiguous carriers. In some instances, the carrier aggregation component 314 can aggregate carriers associated with the one or more frequency resources provided to the base station 300 to increase a bandwidth to a UE.

In some embodiments, the processor(s) 316 is a central processing unit (CPU), a graphics processing unit (GPU), or both CPU and GPU, or other processing unit or component known in the art.

The base station 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and non-volatile, removable and non-removable media implemented in any method or technology for storage of information, such as computer readable instructions, data structures, program modules, or other data. The memory 302, the removable storage 318 and the non-removable storage 320 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the base station 300. Any such tangible computer-readable media can be part of the base station 300.

The base station 300 may be configured to communicate over a telecommunications network using any common wireless and/or wired network access technology. Moreover, the base station 300 may be configured to run any compatible device operating system (OS), including but not limited to, Microsoft Windows Mobile, Google Android, Apple iOS, Linux Mobile, as well as any other common mobile device OS.

The base station 300 also can include input device(s) 322, such as a keypad, a cursor control, a touch-sensitive display, voice input device, etc., and output device(s) 324 such as a display, speakers, printers, etc. These devices are well known in the art and need not be discussed at length here.

As illustrated in FIG. 3, the base station 300 also includes one or more wired or wireless transceiver(s) 326. For example, the transceiver(s) 326 can include a network interface card (NIC), a network adapter, a LAN adapter, or a physical, virtual, or logical address to connect to various network or the network device 102 illustrated in the environment 100, for example. To increase throughput when exchanging wireless data, the transceiver(s) 326 can utilize multiple-input/multiple-output (MIMO) technology. The transceiver(s) 326 can comprise any sort of wireless transceivers capable of engaging in wireless, radio frequency (RF) communication. The transceiver(s) 326 can also include other wireless modems, such as a modem for engaging in Wi-Fi, WiMAX, Bluetooth, infrared communication, and the like.

Figure 4:
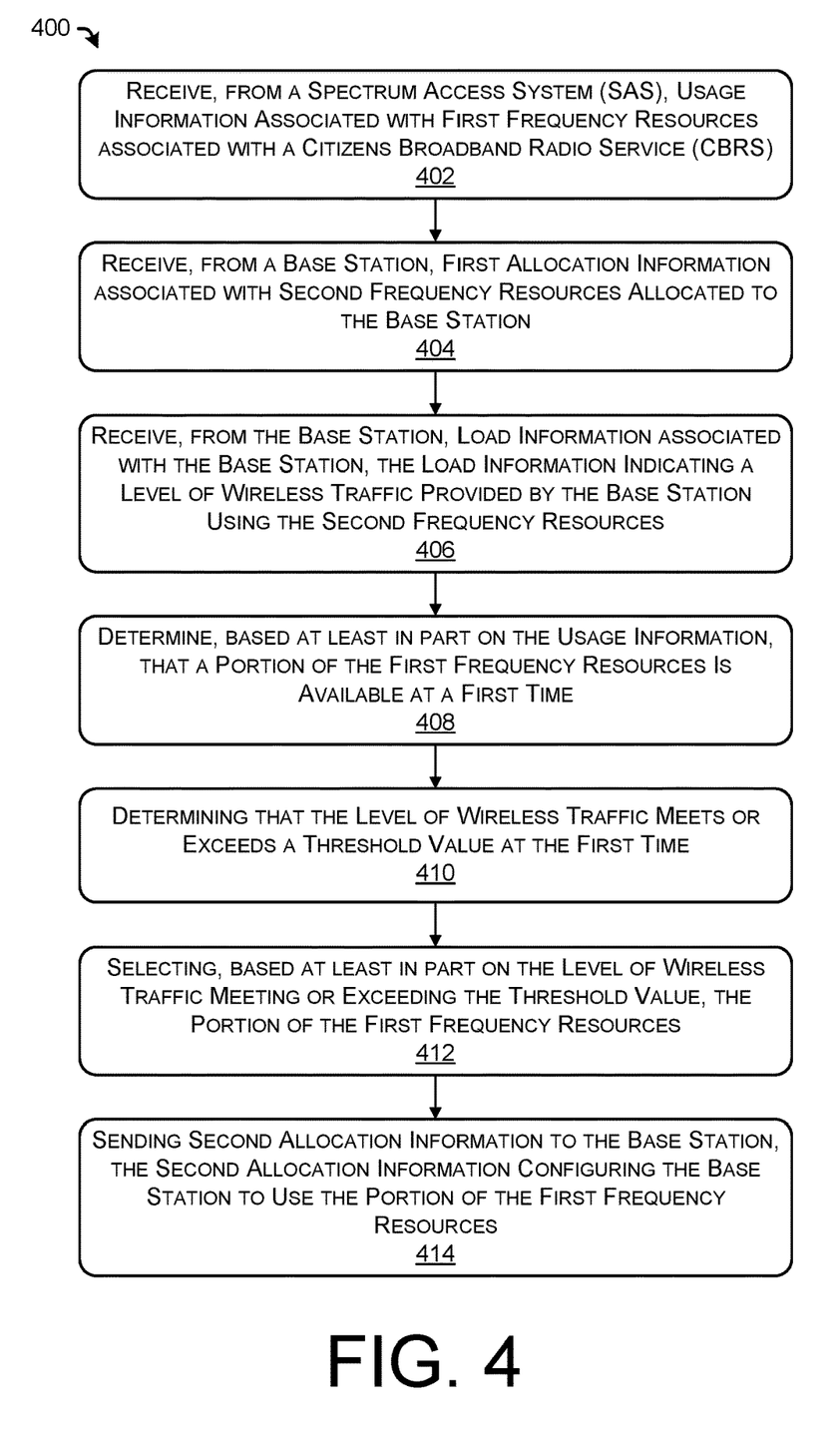
FIG. 4 illustrates an example process for dynamically allocating frequency resources to one or more base stations, in accordance with embodiments of the disclosure.
Figure 5:
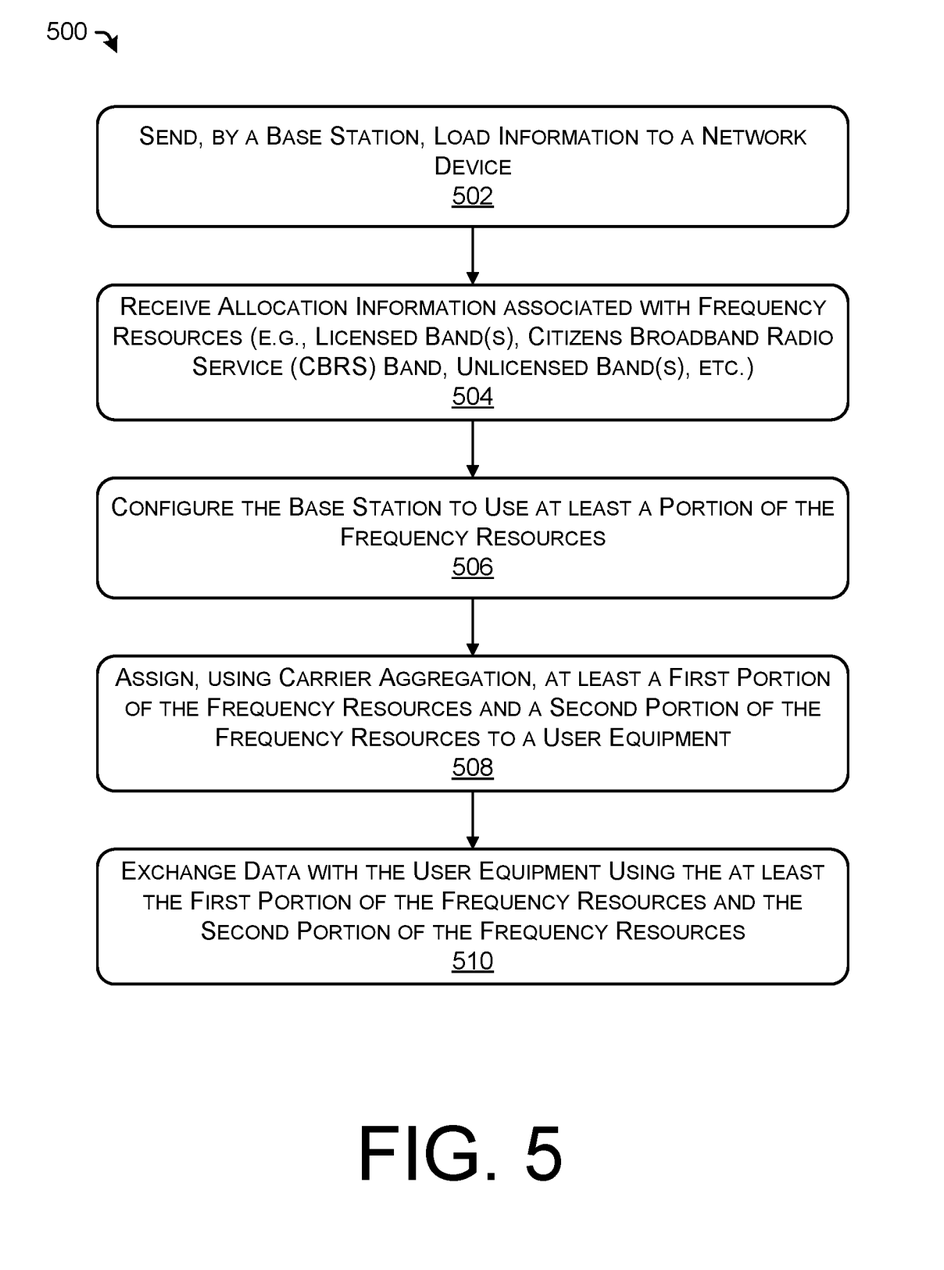
FIG. 5 illustrates an example process for receiving frequency resources at a base station and using the frequency resources to aggregate carriers for wireless communications, in accordance with embodiments of the disclosure.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for dynamically allocating frequency resources to one or more base stations, in accordance with embodiments of the disclosure. The example process 400 can be performed by the network device 102 (or another component), in connection with other components discussed herein. Some or all of the process 400 can be performed by one or more devices, equipment, or components illustrated in FIGS. 1-3, for example.

At operation 402, the process can include receiving, from a Spectrum Access System (SAS), usage information associated with first frequency resources associated with a Citizens Broadband Radio Service (CBRS). In some instances, the usage information can include information regarding a use of one or more frequency resources in the CBRS band by an Incumbent Access user, a Priority Access use, or a General Authorized Access user. In some instances, the usage information can include geographic information associated with one or more usages, and/or can include geographic information indicating a region where one or more frequency resources cannot be used. In some instances, the usage information can indicate that no frequency resources are used.

At operation 404, the process can include receiving, from a base station, first allocation information associated with second frequency resources allocated to the base station. For example, the allocation information can include information regarding which frequency resources are allocated to the base station. In some instances, the operation 404 can include determining the second frequency resources allocated to the base station by accessing a base station allocation database, for example. In some instances, the allocation information can include location information associated with the base station (e.g., location of the transmitter, coverage information, etc.), a base station identifier, and the like.

At operation 406, the process can include receiving, from the base station, load information indicating a level of wireless traffic provided by the base station using the second frequency resources. In some instances, the load information can include, but is not limited to, one or more of: a number of UEs connected to a base station; an amount of bandwidth of traffic handled by the base station (e.g., relative to a total amount of bandwidth); a size of packet queues associated with a base station; a number of dropped packets of the base station; a delay associated with one or more communication of the base station; a number of channels used by one or more UEs; a packet jitter associated with the base station; and the like.

At operation 408, the process can include determining, based at least in part on the usage information, that at least a first portion of the first frequency resources are available at a first time. For example, and as discussed above, the CBRS band may comprise a 150 MHz range of frequencies, with channels of varying size, but which can be allocated in portions smaller than the whole range. For example, a Spectrum Access System (SAS) may allocated a 20 MHz block of frequencies to an Incumbent Access user, a Priority Access user, or a General Authorized Access user, with 130 MHz remaining as unallocated. In such a case, the operation 408 would include determining that the 130 MHz block of frequencies is unallocated at a first time. In some instances, the operation 408 can include determining, based at least in part on historical usage information, a probability or confidence level associated with a determination that the at least the portion of the first frequency resources are available for a minimum amount of time. Of course, the examples discussed above of blocks being allocated or unallocated are examples, and any range of frequencies can be allocated or unallocated, in accordance with the embodiments discussed herein.

At operation 410, the process can include determining that the level of wireless traffic meets or exceeds a threshold value at a first time. In some instances, the threshold value can be set using one or more machine learning algorithms trained to determine a threshold level, that when traffic meets or exceeds the threshold level, corresponds to a degraded performance of communications at the base station when additional frequency resources are not allocated. For example, the threshold level can be based on historical levels of traffic that indicate when a Quality of Service (QoS) may drop off if the traffic increases beyond the threshold without allocating additional resources to the base station.

At operation 412, the process can include selecting, based at least in part on the level of wireless traffic meeting or exceeding the threshold value, the at least the portion of the first frequency resources. For example, the operation 412 can include determining that the portion of the first frequency resources is to be allocated to the base station to mitigate any deleterious effects precipitated by an increase of traffic at the base station. In some instances, the selecting can be performed by one or more machine learning algorithms to optimize a performance of the base station based on the available resources and/or the conditions at a base station.

At operation 414, the process can include sending second allocation information to the base station, the second allocation information configuring the base station to use the at least the portion of the first frequency resources. For example, the second allocation information can instruct the base station to begin using the at least the portion of the first frequency resources to facilitate communications with one or more UEs in communication with the base station. In some instances, the operation 414 can include updating a base station allocation component indicating that the particular frequency resources are allocated to a base station. In some instances, the operation 414 can include reporting the allocation to the SAS to inform the SAS that such frequency resources are being allocated to the base station, as discussed herein.

FIG. 5 illustrates an example process for receiving frequency resources at a base station and using the frequency resources to aggregate carriers for wireless communications, in accordance with embodiments of the disclosure. The example process 500 can be performed by the base stations 106, 108, and/or 110 (or another component), in connection with other components discussed herein. Some or all of the process 500 can be performed by one or more devices, equipment, or components illustrated in FIGS. 1-3, for example.

At operation 502, the process can include sending, by a base station, load information to a network device. As discussed herein, in some instances, load information can include, but is not limited to, one or more of: a number of UEs connected to a base station; an amount of bandwidth of traffic handled by the base station (e.g., relative to a total amount of bandwidth); a size of packet queues associated with a base station; a number of dropped packets of the base station; a delay associated with one or more communication of the base station; a number of channels used by one or more UEs; a packet jitter associated with the base station; and the like. In some instances, the load information can refer to one or more metrics associated with a Quality of Service (QoS) provided by the base station to one or more UEs.

At operation 504, the process can include receiving allocation information associated with frequency resources (e.g., licensed band(s), Citizens Broadband Radio Service (CBRS) band, unlicensed band(s), etc.). For example, the allocation information can be received from a network device that determined one or more frequency resources to allocate to the base station based on the availability of such frequency resources and on the conditions at the base station. As discussed herein, the allocation information can be determined by one or more machine learning algorithms as part of the self-organizing network implementation, as discussed herein.

At operation 506, the process can include configuring the base station to use at least a portion of the frequency resources. In some instances, the operation can include enabling, activating, or otherwise using at least a portion of the frequency resources. In some instances, the operation 506 can include selecting the at least the portion of the frequency resources based at least in part on the operating conditions, such as the load, coverage, capability, interference, etc. as the base station, as discussed herein.

At operation 508, the process can include assigning, using carrier aggregation, at least a first portion of the frequency resources and a second portion of the frequency resources to a user equipment. As discussed herein, the carrier aggregation can include, but is not limited to, contiguous intra-band aggregation, non-contiguous intra-band aggregation, and/or non-contiguous inter-band aggregation.

At operation 510, the process can include exchanging data with the user equipment using the at least the first portion of the frequency resources and the second portion of the frequency resources. As discussed herein, the carrier aggregation can be used to increase a bandwidth provided to one or more UEs in communication with the base station.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for allocating frequency resources in a self-organizing network, the system comprising:
one or more processors;
a memory; and
one or more components stored in the memory and executable by the one or more processors to perform operations comprising:
receiving, from a spectrum access system (SAS), usage information associated with first frequency resources associated with a Citizens Broadband Radio Service (CBRS);
receiving, from a base station, first allocation information associated with second frequency resources allocated to the base station;
receiving, from the base station, load information associated with the base station, the load information indicating a level of wireless traffic provided by the base station using the second frequency resources;
determining, based at least in part on the usage information, that a portion of the first frequency resources is available at a first time;
determining that a portion of a Licensed Assisted Access (LAA) resource is available at the first time;
determining that the level of wireless traffic meets or exceeds a threshold value at the first time;
selecting, based at least in part on the level of wireless traffic meeting or exceeding the threshold value, the portion of the first frequency resources and the portion of the LAA resource; and
sending second allocation information to the base station, the second allocation information configuring the base station to use the portion of the first frequency resources and at least one of the portion of the LAA resource or the second frequency resources for one or more wireless communications.

2. The system of claim 1, wherein the operations further comprise:
receiving, from the base station, capability information indicating that at least one user equipment in communication with the base station is capable of utilizing the first frequency resources; and
selecting the portion of the first frequency resources based at least in part on the capability information.

3. The system of claim 1, wherein the operations further comprise:
receiving, from the base station, coverage information indicating a geographic region associated with the base station; and wherein selecting the portion of the first frequency resources is further based in part on the coverage information.

4. The system of claim 1, wherein the operations further comprise:
determining, based at least in part on the first allocation information, that the portion of the frequency resources is not allocated to the base station.

5. The system of claim 1, wherein the at least the portion of the first frequency resources is a first portion of the first frequency resources, and wherein the operations further comprise:
determining that the first portion of the first frequency resources is not available at a second time;
determining that a second portion of the first frequency resources is available at the second time; and
sending third allocation information to the base station, the third allocation information configuring the base station to use the second portion of the first frequency resource for the one or more wireless communications.

6. The system of claim 1, wherein the operations further comprise:
determining that the level of wireless traffic is within the threshold value at a second time; and
sending third allocation information to the base station, the third allocation information instructing the base station to cease using the portion of the first frequency resources for the one or more wireless communications.

7. The system of claim 1, wherein the second allocation information to the base station configures the base station to use the portion of the first frequency resources and the portion of the LAA resource for the one or more wireless communications.

8. A device comprising:
one or more processors;
a memory; and
one or more components stored in the memory and executable by the one or more processors to perform operations comprising:
receiving usage information associated with first frequency resources, wherein the first frequency resources are associated with a Citizens Broadband Radio Service (CBRS);
determining first allocation information associated with second frequency resources allocated to a base station;
receiving load information associated with the base station, the load information indicating a level of wireless traffic at the base station;
determining that a portion of the first frequency resources is available at a first time;
determining that a portion of a Licensed Assisted Access (LAA) resource is available at the first time;
determining that the level of wireless traffic meets or exceeds a threshold value at the first time;
selecting, based at least in part on the level of wireless traffic meeting or exceeding the threshold value, the portion of the first frequency resources and the portion of the LAA resource; and
sending second allocation information to the base station, the second allocation information configuring the base station to use the portion of the first frequency resources and at least one of the portion of the LAA resource or second frequency resources for one or more wireless communications.

9. The device of claim 8, wherein determining that the portion of the first frequency resources is available comprises determining that the portion of the first frequency resources is not allocated to an incumbent device or a priority access license (PAL).

10. The device of claim 8, wherein the second frequency resources include one or more of a Long Term Evolution (LTE) band 2 or a LTE band 4.

11. The device of claim 10, wherein the operations further comprise:
receiving interference information associated with the base station, the interference information indicating a level of interference associated with one or more communications of the base station;
determining that the level of interference meets or exceeds a threshold interference value;
selecting, based at least in part on the level of interference meeting or exceeding the threshold interference value, third frequency resources; and
sending third allocation information to the base station, the third allocation information configuring the base station to use the third frequency resource for the one or more wireless communications.

12. The device of claim 8, wherein the operations further comprise:
sending, to a spectrum access system (SAS), an indication that the portion of the first frequency resources is allocated to the base station at the first time.

13. The device of claim 8, wherein the operations further comprise:
receiving capability information indicating that at least one user equipment in communication with the base station is capable of utilizing the first frequency resources; and
selecting the portion of the first frequency resources based at least in part on the capability information.

14. The device of claim 8, wherein the operations further comprise:
determining that the first allocation information indicates that a Long Term Evolution (LTE) band 2 and a LTE band 4 are allocated to the base station; and
wherein selecting the portion of the first frequency resources is further based in part on the LTE band 2 and the LTE band 4 being allocated to the base station.

15. The device of claim 8, wherein the operations further comprise:
dynamically updating one or more frequency resources allocated to the base station over time.

16. The device of claim 8, wherein the second allocation information to the base station configures the base station to use the portion of the first frequency resources and the portion of the LAA resource for the one or more wireless communications.

17. A method implemented by one or more processors, the method comprising:
receiving usage information associated with first frequency resources, wherein the first frequency resources are associated with a Citizens Broadband Radio Service (CBRS);
determining first allocation information associated with second frequency resources allocated to a base station;
receiving load information associated with the base station, the load information indicating a level of wireless traffic at the base station;
determining that a portion of the first frequency resources is available at a first time;

determining that a portion of a Licensed Assisted Access (LAA) resource is available at the first time;

determining that the level of wireless traffic meets or exceeds a threshold value at the first time;

selecting, based at least in part on the level of wireless traffic meeting or exceeding the threshold value, the portion of the first frequency resources and the portion of the LAA resource; and sending second allocation information to the base station, the second allocation information configuring the base station to use the portion of the first frequency resources and at least one of the portion of the LAA resource or the second frequency resources for one or more wireless communications.

18. The method of claim 17, wherein determining that the portion of the first frequency resources is available comprises determining that the portion of the first frequency resources is not allocated to an incumbent device or a priority access license (PAL).

19. The method of claim 17, wherein the method further comprises:

receiving interference information associated with the base station, the interference information indicating a level of interference associated with one or more communications of the base station;

determining that the level of interference meets or exceeds a threshold interference value;

selecting, based at least in part on the level of interference meeting or exceeding the threshold interference value, third frequency resources; and sending third allocation information to the base station, the third allocation information configuring the base station to use the third frequency resource for the one or more wireless communications.

20. The method of claim 17, wherein the method further comprises:

receiving capability information indicating that at least one user equipment in communication with the base station is capable of utilizing the first frequency resources; and selecting the portion of the first frequency resources based at least in part on the capability information.

* * * * *